(12) United States Patent
Kim et al.

(10) Patent No.: US 7,558,165 B2
(45) Date of Patent: Jul. 7, 2009

(54) DISC DRIVE CALIBRATION WITH FORCED TRACK TRAVERSING SIGNAL

(75) Inventors: Je-Kook Kim, Yongin (KR); Young-Wook Jang, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

(21) Appl. No.: 10/947,114

(22) Filed: Sep. 22, 2004

(65) Prior Publication Data

US 2006/0002248 A1    Jan. 5, 2006

(30) Foreign Application Priority Data

May 7, 2004    (KR)    ............ 10-2004-0032201

(51) Int. Cl.
*G11B 7/00*    (2006.01)
(52) U.S. Cl. .................. 369/44.28; 369/53.23
(58) Field of Classification Search ............. 369/44.29; G11B 7/09
See application file for complete search history.

(56) References Cited

U.S. PATENT DOCUMENTS

| | | | |
|---|---|---|---|
| 4,775,966 A | 10/1988 | Miura et al. | 369/44 |
| 4,907,214 A | 3/1990 | Nagano et al. | 369/49 |
| 5,042,022 A * | 8/1991 | Ogawa | 369/47.52 |
| 5,471,448 A * | 11/1995 | Yokogawa | 369/44.29 |
| 5,926,445 A * | 7/1999 | Sasaki et al. | 369/44.25 |
| 6,014,354 A * | 1/2000 | Nomura et al. | 369/44.28 |
| 2004/0090884 A1 | 5/2004 | Kim et al. | |

* cited by examiner

*Primary Examiner*—Paul Huber
(74) *Attorney, Agent, or Firm*—Monica H. Choi (57) ABSTRACT

A signal generator generates a track traversing signal, and a driver causes a pick-up to traverse across tracks of a disc in accordance with the track traversing signal. An error signal generator generates a tracking error signal from the pick-up traversing across the tracks of the disc in accordance with the track traversing signal. A parameter calculator determines a value of a calibration parameter from the tracking error signal that is generated without delay and without signal distortion from low frequency components.

45 Claims, 10 Drawing Sheets

DISC DRIVE CALIBRATION WITH FORCED TRACK TRAVERSING SIGNAL

CROSS-REFERENCE TO RELATED APPLICATION(S)

The present application claims priority under 35 U.S.C. § 119 to Korean Patent Application No. 2004-0032201, filed on May 7, 2004, which is incorporated herein by reference in its entirety.

TECHNICAL FIELD

The present invention relates generally to disc drives such as optical disc drives, and more particularly, to a method and apparatus for determining value(s) of calibration parameter(s) of the disc drive using a forced track traversing signal.

BACKGROUND OF THE INVENTION

The present invention is described for an optical disc drive. However, the present invention may in general be used for calibration within other types of disc drives.

Figure 1:
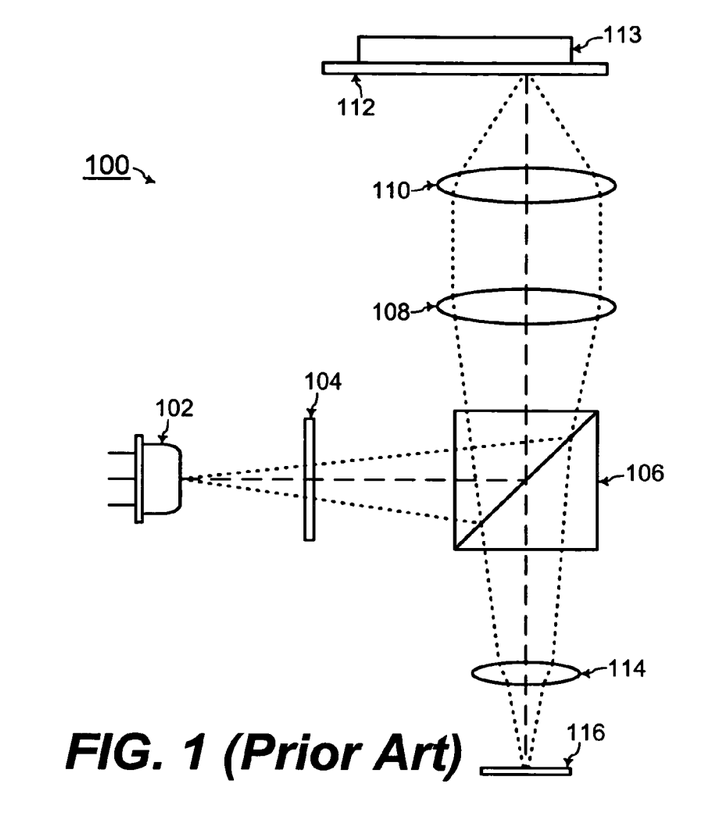
FIG. 1 shows components of a conventional optical pick-up, according to the prior art.

FIG. 1 shows a block diagram of an optical pick-up 100 of an optical disc drive with light generated at a laser diode 102. The light from the laser diode 102 passes through a grating 104 that splits such light into a main beam and two side beams. The main and side beams of light are reflected by a beam splitter 106 to be directed through a collimating lens 108. The beams of light from the collimating lens 108 are focused by an objective lens 110 onto an optical disc 112.

The beams of light are then reflected from the optical disc 112 and pass back through the objective lens 110 and the collimating lens 108. Such reflected beams of light pass through the beam splitter 106 to reach a second objective lens 114. The second objective lens 114 focuses the reflected beams of light onto a photo-detector 116. A spindle motor mechanism 113 rotates the optical disc 112 during data reproduction.

Figure 2A:
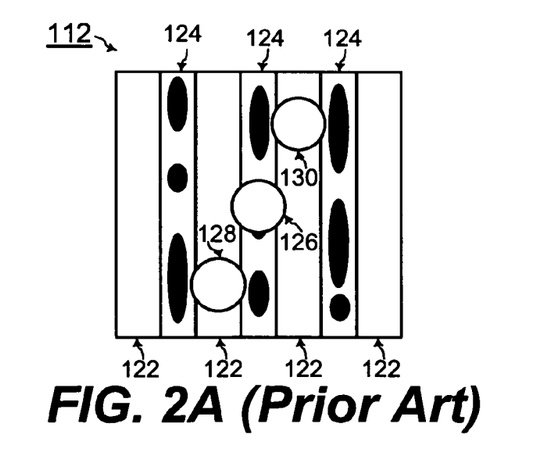
FIG. 2A shows lands and grooves for an optical disc with main and side beams directed onto the disc, according to the prior art.

FIG. 2A shows a magnified view of tracks on the optical disc 112 having a plurality of alternating lands 122 and grooves 124 along the radial direction of the optical disc 112. Further referring to FIG. 2A, data is recorded with data pits (illustrated as blackened areas in FIG. 2A) formed on the grooves 124 in some types of optical discs.

Additionally referring to FIG. 2A, a main beam 126 is directed onto a groove, and first and second side beams 128 and 130 are directed onto the adjacent lands. The first side beam 128 lags the main beam 126, and the second side beam 130 leads the main beam 126. The main and side beams 126, 128, and 130 are formed by the components of the optical pick-up 100 of FIG. 1.

Figure 2B:
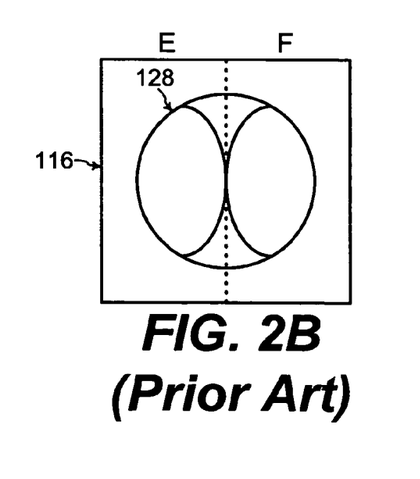
FIG. 2B shows two intensity signals E and F generated from two halves of a side beam reflected from the disc, according to the prior art.

The side beams 128 and 130 are used for tracking to maintain the main beam 126 centered along a groove 124 with data pits. FIG. 2B shows the photo-diode 116 measuring an intensity of the first side beam 128 reflected from the optical disc 112. Referring to FIG. 2B, assume "E" denotes an intensity of light toward a left of the first side beam 128 reflected from the optical disc 112. Similarly, assume "F" denotes an intensity of light toward a right of the first side beam 128 reflected from the optical disc 112. A TE (tracking error) signal is calculated as follows using the E and F signals:

$$TE = E - F$$

When the main beam 126 is centered along a groove 124, the value of the TE signal is at a center level, TCNTR. When the main beam 126 and the side beams 128 and 130 are shifted undesirably toward the right, F decreases such that the TE signal changes to be more positive from the center level, TCNTR. When the main beam 126 and the side beams 128 and 130 are shifted undesirably toward the left, E decreases such that the TE signal changes to be more negative from the center level, TCNTR.

For proper tracking operation, the TE signal is desired to be centered about a reference level, VREF. Thus, TCNTR of the TE signal is desired to be substantially equal to the reference level, VREF. Thus, after loading a disc into the disc drive, calibration is performed such that the measured TE signal is calibrated to be centered about the reference level, VREF.

Figure 3:
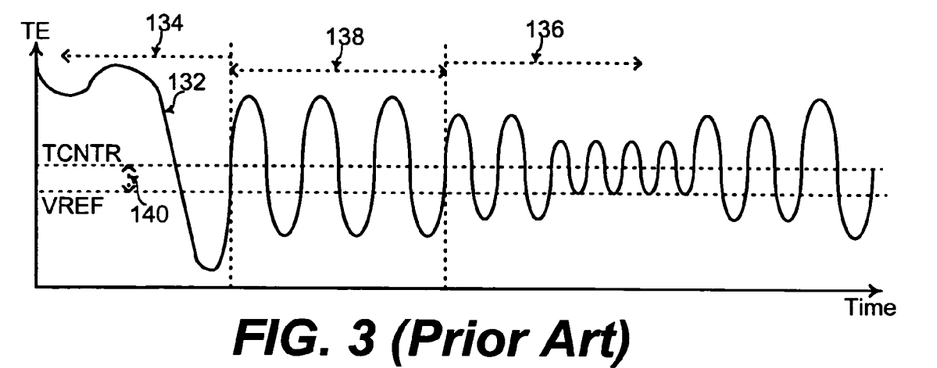
FIG. 3 shows a tracking error signal generated from the E and F signals of FIG. 2B with varying frequency from varying rotational speed of the disc, according to the prior art.

Referring to FIGS. 1 and 3, in the prior art calibration, when the disc 112 is loaded into the disc drive, the disc 112 is rotated, and the TE signal 132 is generated as the optical pick-up 100 is stationary. In FIG. 3, the TE signal 132 has a lower frequency range 134 for a lower rotational speed of the disc 112 and a higher frequency range 136 for a higher rotational speed of the disc 112. The TE signal 132 also has an ideal frequency range 138 for a desired range of rotational speed of the disc 112.

Further referring to FIG. 3, the measured TE signal 132 is centered about the center value, TCNTR, which is different from the reference level, VREF, by an offset 140. During calibration of the disc drive, the amount of offset 140 is determined to adjust the TE signal 132 to be centered about the reference level, VREF.

For such calibration, the TE signal within the ideal frequency range 138, such as 500 Hz to 1000 Hz for example, is used for accurately determining the offset 140. When the TE signal has a higher frequency from the ideal frequency range 138, the amplitude of the TE signal may be too low for accurate determination of the offset 140. When the TE signal has a lower frequency from the ideal frequency range 138, determination of the offset 140 may require too much time.

Unfortunately, such prior art calibration requires a delay until the rotational speed of the optical disc 112 reaches a desired range for the frequency of the TE signal to be within the ideal frequency range 138. In addition, referring to FIG. 4A, even when the frequency of the TE signal is within the ideal frequency range 138, two low frequency ranges 142 and 144 occur in the TE signal every one 360° rotation of the optical disc 112 because of eccentricity of the optical disc 112.

Figure 4A:
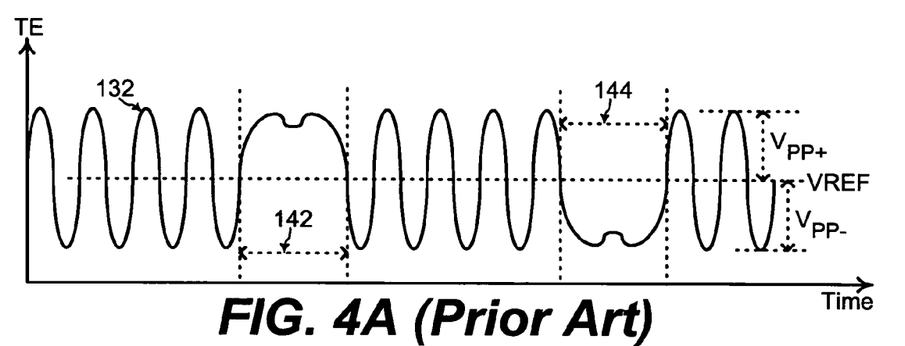
FIG. 4A shows a tracking error signal with low frequency distortion from eccentricity of the disc, according to the prior art.
Figure 4B:
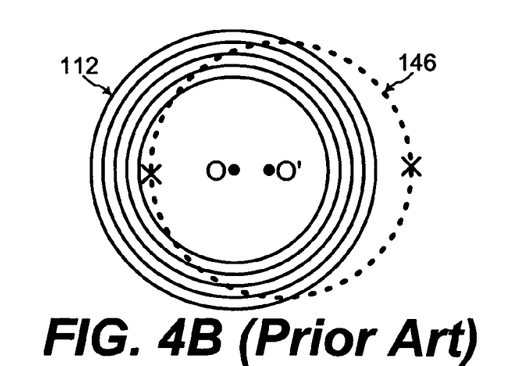
FIG. 4B illustrates a path of positions of the pick-up with respective to the disc with eccentricity resulting in the low frequency distortion in FIG. 4A, according to the prior art.

FIG. 4B shows the optical disc 112 with concentric tracks and a path 146 of positions of the stationary optical pick-up 100 with respect to the optical disc 112 for one 360° rotation of the optical disc 112. Eccentricity of the optical disc 112 means that a center O of the optical disc 112 is offset from a center O' of rotation of the optical disc 112.

Referring to FIGS. 4A and 4B, the two low frequency ranges 142 and 144 in the TE signal 132 occur around the two points marked X in the path 146 for every one 360° rotation of the optical disc 112. In FIG. 4A, a positive peak value $V_{PP+}$ of the TE signal 132 is compared with a negative peak value $V_{PP-}$ of the TE signal with respect to the reference voltage, VREF, for offset calibration. However, such a comparison of the peak values $V_{PP+}$ and $V_{PP-}$ cannot be as easily performed in the prior art with the signal distortion of the TE signal in the two low frequency ranges 142 and 144.

Thus, a mechanism is desired for generating a tracking error signal without delay and without signal distortion from low frequency components.

SUMMARY OF THE INVENTION

Accordingly, the optical pick-up is forced to traverse tracks of the optical disc in accordance with a track traversing signal to generate a tracking error signal, without delay and without signal distortion according to a general aspect of the present invention.

In one embodiment of the present invention, a signal generator generates a track traversing signal, and a driver causes a pick-up to traverse across tracks of a disc in accordance with the track traversing signal. An error signal generator generates a tracking error signal from the pick-up traversing across the tracks of the disc in accordance with the track traversing signal. A parameter calculator determines the value of the calibration parameter from the tracking error signal.

In another embodiment of the present invention, a signal selector selects between the track traversing signal and the tracking error signal for being coupled to the driver of the pick-up. The signal selector is a multiplexer that selects the track traversing signal to be coupled to the driver when the value of the calibration parameter is determined, and that selects the tracking error signal to be coupled to the driver after the value of the calibration parameter is determined.

In a further embodiment of the present invention, a micom controls the signal selector, the error signal generator, and the parameter calculator such that the value of the calibration parameter is determined upon loading of the disc into the disc drive. In addition, the micom controls the signal selector, the error signal generator, and the parameter calculator to determine the value of the calibration parameter irrespective of a rotational speed of the disc. Furthermore, the micom controls the signal selector, the error signal generator, and the parameter calculator to determine the value of the calibration parameter before reproduction of data from the disc.

In yet another embodiment of the present invention, a spindle motor rotates the disc as the pick-up traverses across the tracks of the disc in accordance with the track traversing signal.

When the pick-up is an optical pick-up, the calibration calculator is a tracking balance controller for determining the calibration parameter that is a respective gain value determined from the tracking error signal for each of two amplifiers used for determining the tracking error signal.

In another embodiment of the present invention, a data signal synthesizer generates a data signal as the pick-up traverses across the tracks of the disc in accordance with the track traversing signal. In addition, the parameter calculator determines a duty cycle control value for a MIRR signal, from the data signal and the tracking error signal.

In a further embodiment of the present invention, the signal generator generates a periodic signal such as a sine wave as the track traversing signal. In an alternative embodiment of the present invention, the signal generator is implemented as a memory device for storing values of the track traversing signal.

The present invention may be used to particular advantage when the disc drive is an optical disc drive, with the pick-up being an optical pick-up. However, the present invention may in general be used for calibration within other types of disc drives.

In this manner, the tracking error signal is generated as the pick-up is forced to move across tracks of the disc in accordance with the generated track traversing signal. As a result, such a tracking error signal has a relatively constant frequency without low frequency distortion. In addition, the tracking error signal is generated as the pick-up is moved shortly after the disc is loaded into the disc drive irrespective of the rotational speed of the disc. Thus, the tracking error signal is generated without delay shortly after the disc is loaded.

These and other features and advantages of the present invention will be better understood by considering the following detailed description of the invention which is presented with the attached drawings.

The figures referred to herein are drawn for clarity of illustration and are not necessarily drawn to scale. Elements having the same reference number in FIGS. 1, 2A, 2B, 3, 4A, 4B, 5, 6, 7, 8, 9, 10A, 10B, 11, 12, 13, 14, 15, and 16 refer to elements having similar structure and function.

DETAILED DESCRIPTION

Figure 5:
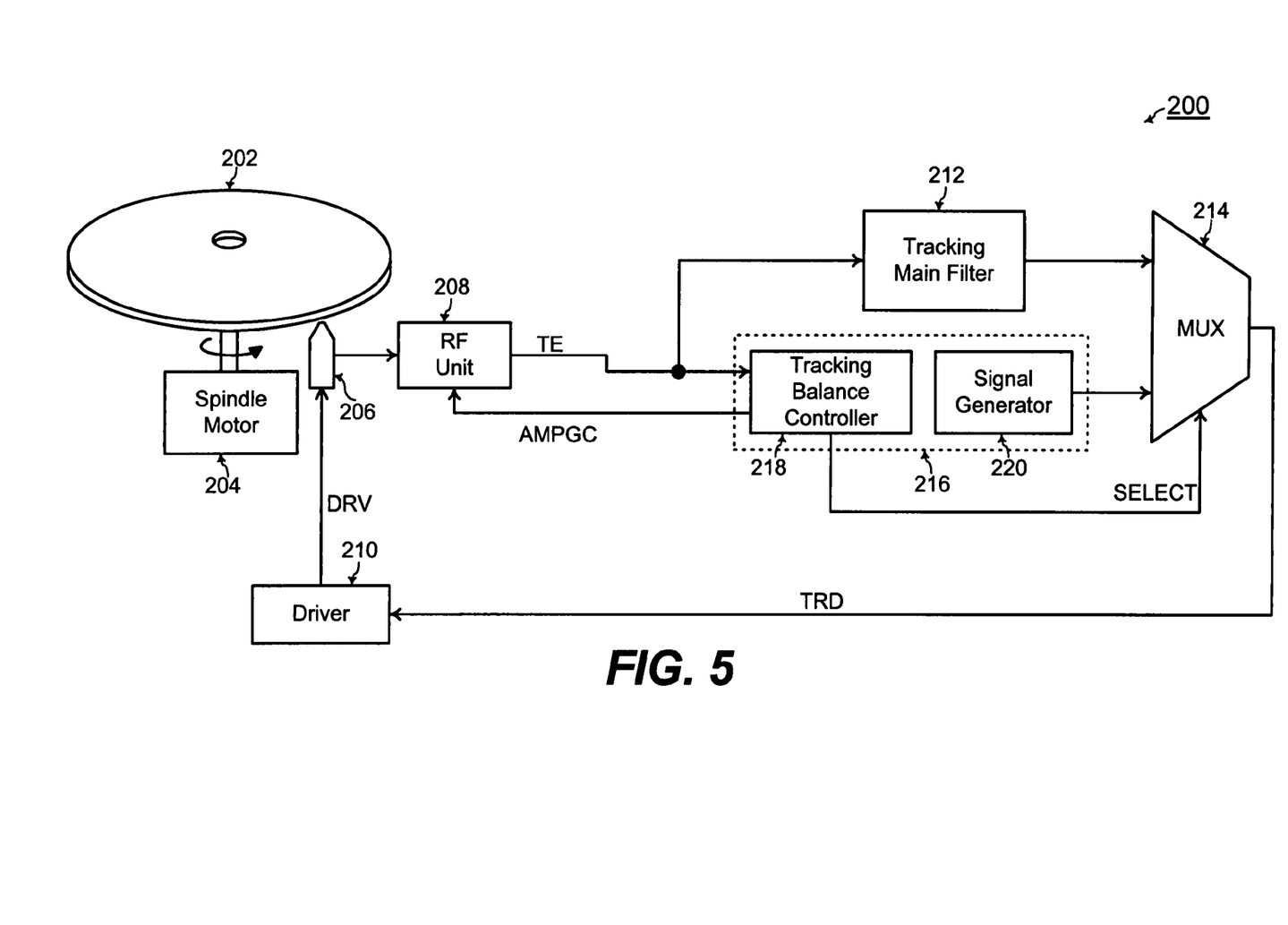
FIG. 5 shows a block diagram of an optical disc drive with an optical pick-up forced to traverse tracks of an optical disc in accordance with a track traversing signal for generating a tracking error signal, according to an embodiment of the present invention.

Referring to FIG. 5, an optical disc 202 is loaded into an optical disc drive 200 of an embodiment of the present invention. The present invention is described for an optical disc drive. However, the present invention may in general be used for calibration within other types of disc drives.

A spindle motor 204 rotates the optical disc 202 that is loaded into the disc drive 200. The disc drive 200 also includes an optical pick-up 206 that has similar structure and function as the optical pick-up 100 of FIG. 1.

Figure 6:
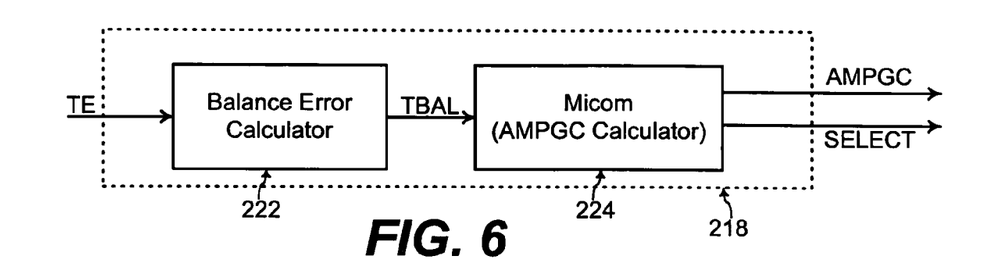
FIG. 6 shows a block diagram of a tracking balance controller of FIG. 5 for determining an AMPGC value for calibration of an offset of the tracking error signal, according to an embodiment of the present invention.

In addition, the disc drive 200 includes a RF unit 208, a pick-up driver 210, a tracking main filter 212, a multiplexer 214, and a tracking control unit 216 comprised of a tracking balance controller 218, and a signal generator 220. FIG. 6 shows a block diagram of the tracking balance controller 218 of FIG. 5 including a balance error calculator 222 and a micom (micro-computer) 224.

Figure 7:
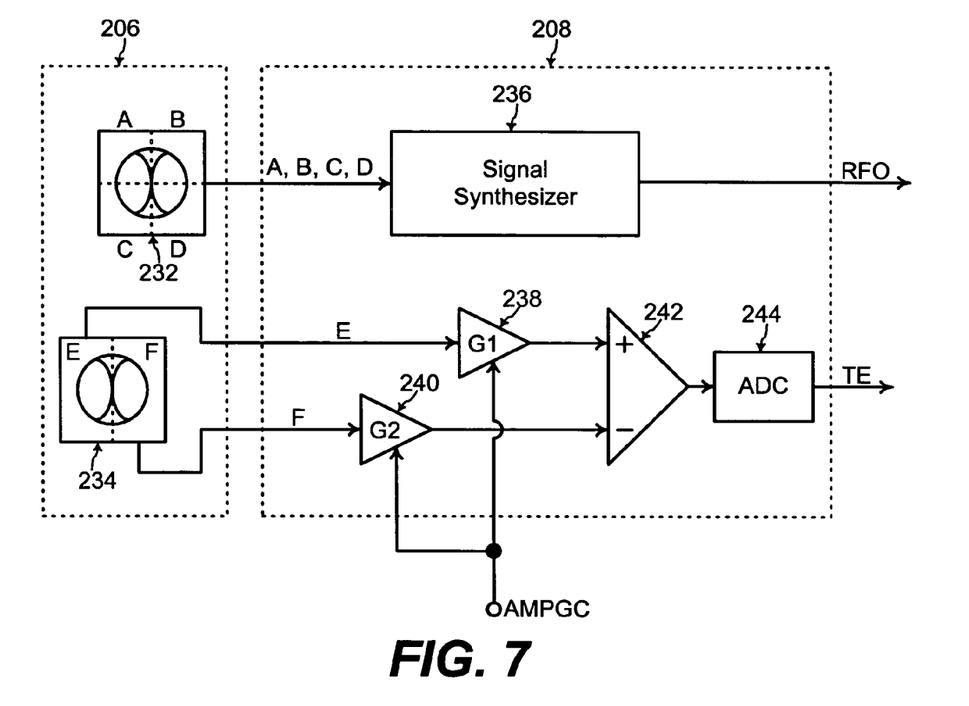
FIG. 7 shows a block diagram of a RF unit of FIG. 5 using the AMPGC value for centering the tracking error signal about a reference value, VREF, according to an embodiment of the present invention.

FIG. 7 shows a block diagram of the RF unit 208 and photo-detectors within the optical pick-up 206 of FIG. 5. The optical pick-up 206 includes a main beam photo-detector 232 and a side beam photo-detector 234. The RF unit 208 includes a data signal synthesizer 236, a first gain amplifier 238, a second gain amplifier 240, a comparator 242, and an ADC (analog-to-digital converter) 244.

Figure 8:
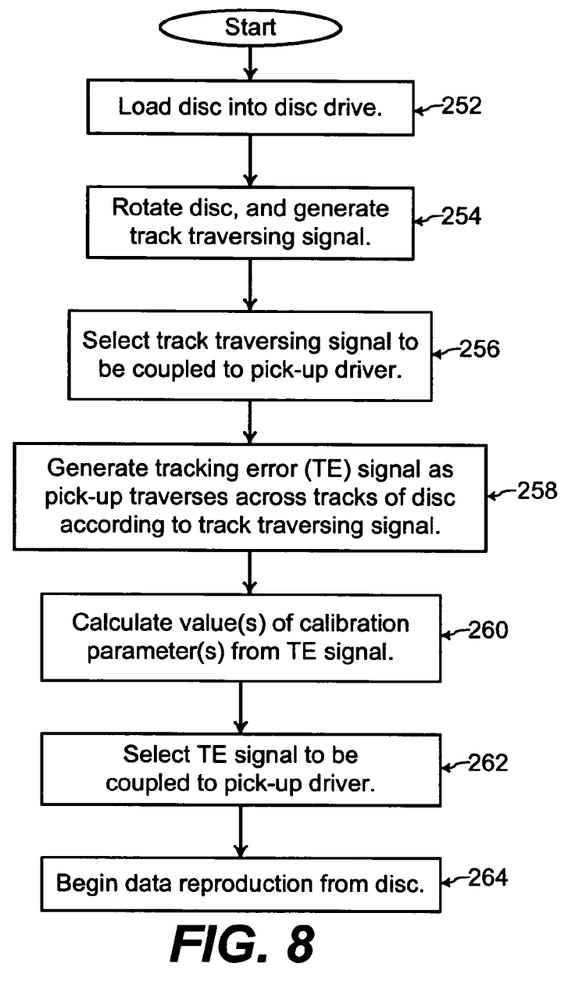
FIG. 8 shows a flow-chart of steps for operation of the components of the disc drive of FIG. 5, according to an embodiment of the present invention.

The components of FIGS. 5, 6, and 7 operate according to the flow-chart of FIG. 8. Referring to FIGS. 5, 6, 7, and 8, when the optical disc 202 is loaded into the disc drive (step 252 of FIG. 8), the spindle motor rotates the optical disc, and the signal generator 220 generates a track traversing signal (step 254 of FIG. 8). In addition, the micom 224 of the tracking balance controller 218 sets a logical state of a SELECT signal such that the multiplexer 214 selects the track traversing signal from the signal generator 220 as a TRD (driver tracking) signal (step 256 of FIG. 8).

Figure 10A:
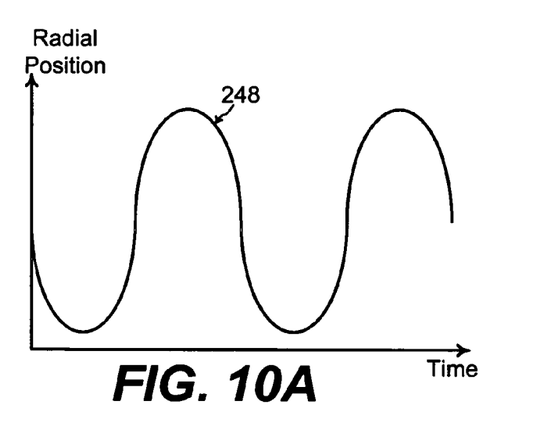
FIG. 10A shows an example of the track traversing signal in the disc drive of FIG. 5, according to an embodiment of the present invention.

The driver uses the TRD signal from the multiplexer 214 to generate a DRV (driving) signal that drives the optical pick-up 206. Thus, the optical pick-up 206 moves along a radial direction of the optical disc 202 in accordance with the track traversing signal from the signal generator 220. FIG. 10A shows an example track traversing signal 248 as a sine wave generated by the signal generator 220.

Figure 10B:
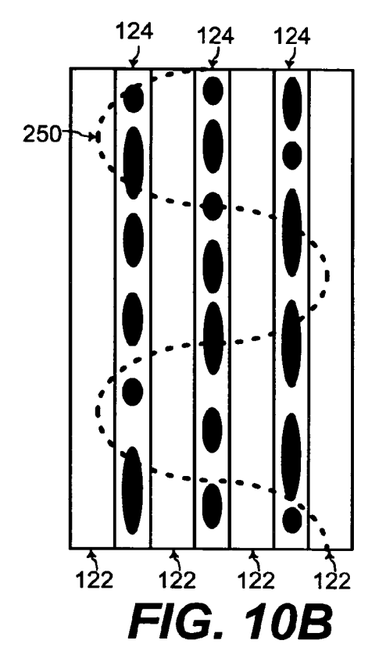
FIG. 10B illustrates a path of positions of the optical pick-up with respect to tracks of the optical disc in the disc drive of FIG. 5, according to an embodiment of the present invention.

With such a track traversing signal 248, the driver 210 drives the optical pick-up 206 to traverse the tracks of the optical disc 202 in the radial direction back and forth between a perimeter of the optical disc 202 and a center of the optical disc 202 according to the track traversing signal 248. FIG. 10B shows tracks of the optical disc 202 including alternating lands 122 and grooves 124. In addition, FIG. 10B illustrates a path 250 of positions of the optical pick-up 206 with respect to the optical disc 202 as the optical pick-up 206 traverses the tracks of the optical disc 202 and as the optical disc 202 is rotated by the spindle motor 204.

As the optical pick-up 206 traverses the tracks of the optical disc 202, a TE (tracking error) signal is generated by the RF unit 208 (step 258 of FIG. 8). The optical pick-up 206 is similar to the optical pick-up 100 of FIG. 1 and directs main and side beams of light onto the optical disc drive 202.

Referring to FIG. 7, the side beam photo-detector 234 generates an E signal indicating an intensity of light toward a left of a reflected side beam and an F signal indicating an intensity of light toward a right of the reflected side beam. Referring to FIGS. 2A, 5, 6, and 7, the micom 224 selects one of the reflected side beams 128 and 130 to be used by the photo-detector 234 for generating the E and F signals. In one embodiment of the present invention, With the gain amplifiers 238 and 240 having gains of $G_1$ and $G_2$, respectively, and with the comparator 242, the tracking error (TE) signal is expressed as follows:

$$TE = G_1 * E - G_2 * F$$

The ADC 244 converts analog values of the TE signal into digital values to generate a digital signal as the TE signal. In one embodiment of the present invention, the comparator 242 further amplifies the TE signal before the ADC 244 converts the output of the comparator 242.

Referring to FIG. 10B, as the optical pick-up 206 traverses the tracks of the optical disc 202 according to the path 250 of FIG. 7, the optical pick-up 206 directs main and side beams of light onto the optical pick-up 206 along the path 250. The TE signal is generated from the reflection of a side beam from the optical disc 202 as the optical pick-up 206 travels along the path 250 with respect to the optical disc 202.

Figure 9:
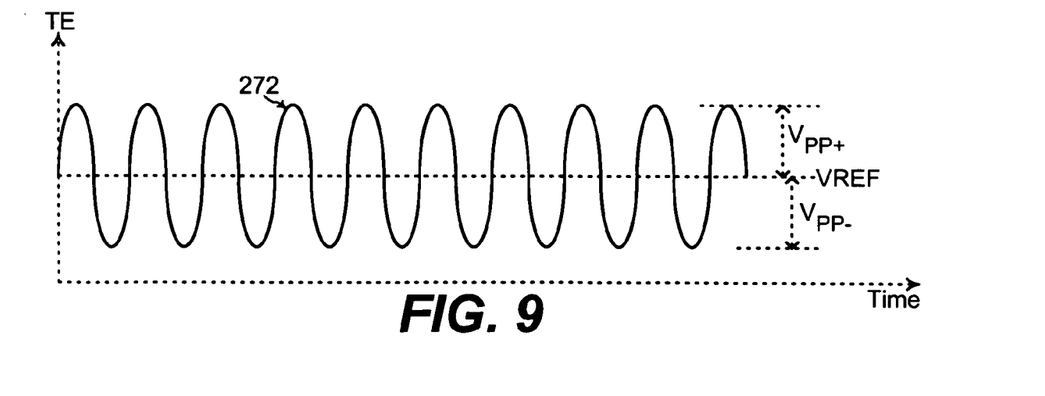
FIG. 9 shows the tracking error signal generated in the disc drive of FIG. 5, according to an embodiment of the present invention.

FIG. 9 shows an example TE (tracking error) signal 272 generated in this manner of the present invention. The TE signal 272 is a periodic signal with a relatively constant frequency. The frequency of the TE signal 272 is determined by a frequency of the track traversing signal 248 of FIG. 10A and the pitch of the tracks of the optical disc 202. In one embodiment of the present invention, the frequency of the track traversing signal 248 is in a range of from about 10 Hz to about 100 Hz, and the frequency of the TE signal 272 is in a range of from about 500 Hz to about 1000 Hz.

Referring to FIG. 8, such a TE signal 272 is used for calibration of the disc drive 200 including for calculating value(s) of calibration parameters (step 260 of FIG. 8). Referring to FIGS. 5, 6, 7, and 9, an example of calibration parameters are the gains $G_1$ and $G_2$ of the amplifiers 238 and 240, respectively, within the RF unit 208. Referring to FIG. 9, the TE signal 272 is desired to be centered about the reference level, VREF. Referring to FIG. 6, the balance error calculator compares a positive peak value $V_{PP+}$ from VREF and a negative peak value $V_{PP-}$ from VREF.

Ideally, $V_{PP+}$ is desired to be substantially equal to $V_{PP-}$, and the balance error calculator 222 generates a TBAL (tracking balance) signal indicating the levels of $V_{PP+}$ and $V_{PP-}$ from VREF. The MICOM 224 receives the TBAL signal and generates an AMPGC (amplifier gain control) signal indicating the level of offset of $V_{PP+}$ and $V_{PP-}$ from VREF.

Referring to FIG. 7, the gain amplifiers 238 and 240 use such an AMPGC signal for adjusting the gains $G_1$ and $G_2$ of the amplifiers 238 and 240, respectively, such that the subsequently generated TE signal has $V_{PP+}$ from VREF substantially equal to $V_{PP-}$ from VREF. Thus, the gains $G_1$ and $G_2$ of the amplifiers 238 and 240, respectively, are the calibration parameters with values determined using the TE signal 272 generated from the optical pick-up 206 traversing the tracks of the optical disc 202 according to the track traversing signal 248.

After such calibration, the micom 224 sets the logical level of the SELECT signal such that the multiplexer 214 selects a normal tracking control signal as output by the tracking main filter 212 as the TRD signal. Thus, the filtered TE signal is coupled to the optical pick-up driver 210 (step 262 of FIG. 8) after calibration, for normal tracking within the disc drive 200. With such normal tracking, the disc drive 200 begins data reproduction from the optical disc 202 (step 264 of FIG. 8).

In this manner, a forced track traversing signal 248 generated from the signal generator 220 is coupled to the optical pick-up driver 210 during calibration of the disc drive. Thus, the TE signal 272 is generated without signal distortion from low frequency components as the optical pick-up 206 traverses the tracks of the optical disc 202 according to the forced track traversing signal 248. Such a TE signal 272 without signal distortion results in accurate calibration of the disc drive 200.

Figure 11:
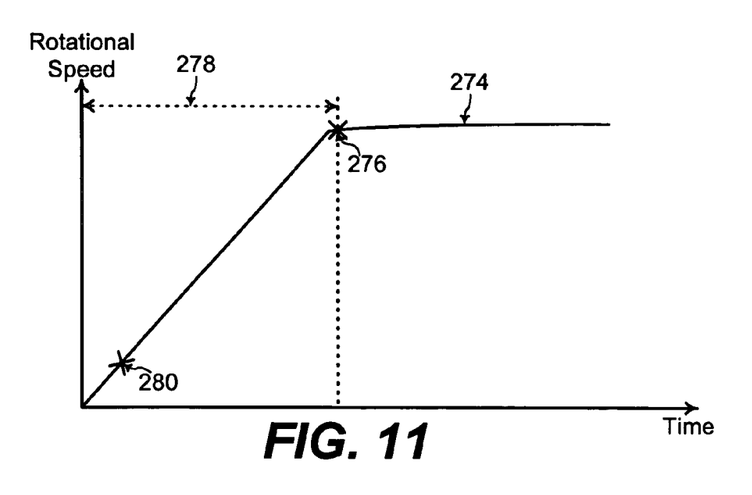
FIG. 11 illustrates how the tracking error signal is generated without delay shortly after the optical disc is loaded into the disc drive, according to an embodiment of the present invention.

In addition, the TE signal 272 is generated irrespective of the rotational speed of the optical disc 202. FIG. 11 shows a plot 274 of rotational speed of the optical disc 202 with time after the optical disc 202 is loaded into the disc drive 200. In the prior art calibration, the TE signal is generated as the optical disc is rotated with a stationary optical pick-up. Thus, the prior art calibration waits until a later time point 276 with an undesired delay 278 for adequate rotational speed of the optical disc 202 when the TE signal has a frequency in an acceptable range.

In contrast, with the calibration of the present invention, the TE signal is generated with the optical pick-up 206 traversing tracks of the optical disc 202 according to the track traversing signal 248. Thus, the TE signal is generated irrespective of the rotational speed of the optical disc 202 at an earlier time point 280 without the delay 278 of the prior art.

In one embodiment of the present invention, the micom 224 controls the other components of FIGS. 5, 6, and 7 to operate according to the flow-chart of FIG. 8. The micom 224 also controls such components of FIGS. 5, 6, and 7 such that calibration with the TE signal is performed irrespective of the rotational speed of the optical disc 202 such as at the earlier time point 280 shortly after the optical disc 202 is loaded into the disc drive 200.

The foregoing is by way of example only and is not intended to be limiting. For example, the track traversing signal 248 may be any other type of periodic signal such as a periodic triangular wave. Implementation for a signal generator that generates such periodic signals individually is known to one of ordinary skill in the art of electronics.

In addition, the multiplexer 214 is an example signal selector for selecting the track traversing signal 248 from the signal generator 220 during calibration and for selecting the filtered TE signal from the tracking main filter 212 after calibration. The RF unit 208 is an example error signal generator that generates the TE signal 272 with the components 238, 240, 242, and 244. The tracking balance controller 218 and the gain amplifiers 238 and 240 comprise an example parameter calculator that determines the values of the gain parameters $G_1$ and $G_2$ of the gain amplifiers 238 and 240 from the TE signal 272.

Figure 12:
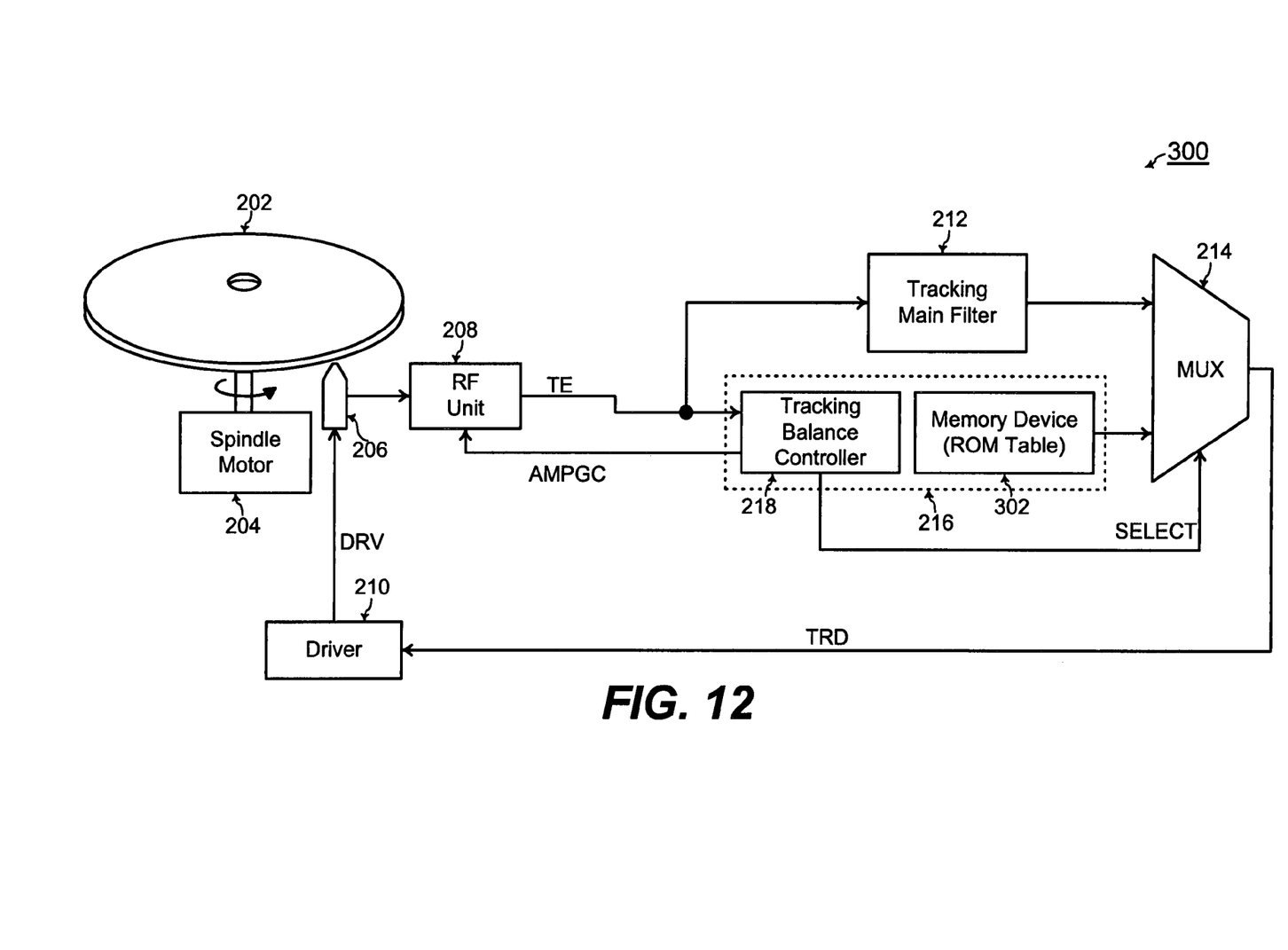
FIG. 12 shows a block diagram of an alternative embodiment of an optical disc drive of the present invention with a memory device for storing values of the track traversing signal.

FIG. 12 shows a disc drive 300 according to an alternative embodiment of the present invention. Elements having the same reference number in FIGS. 5 and 12 refer to elements having similar structure and function. Thus, the disc drive 300 of FIG. 12 operates similarly to the disc drive 200 of FIG. 5 according to the flow-chart of FIG. 8. One difference is that a memory device 302 is used as the signal generator 220 of FIG. 5 for storing values of the track traversing signal. In one embodiment of the present invention, the memory device 302 is a ROM (read only memory) table storing the values of the track traversing signal. Such values for the track traversing signal are read out from the memory device 302 to the multiplexer 214 for generating the track traversing signal.

Figure 13:
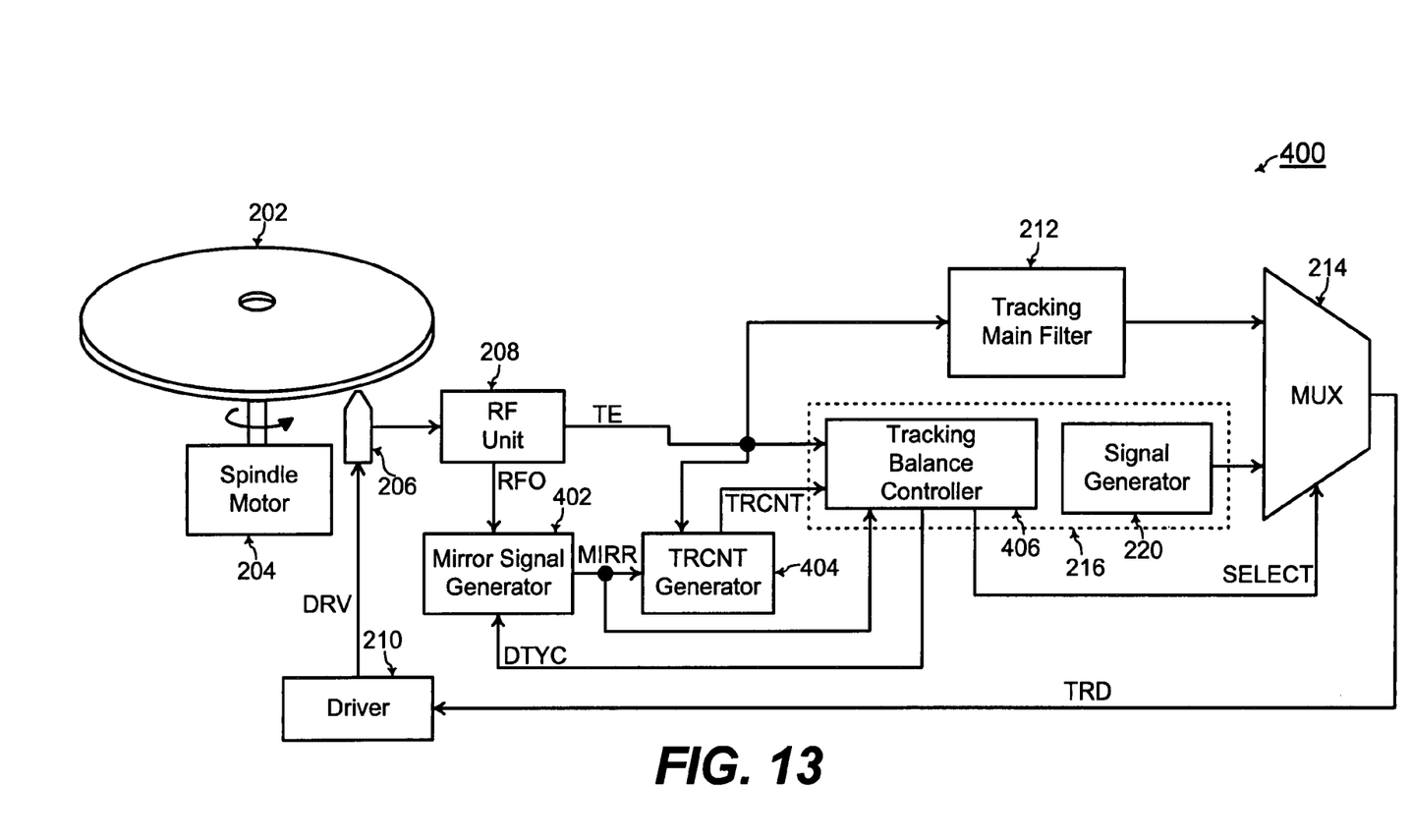
FIG. 13 shows a block diagram of an alternative embodiment of an optical disc drive of the present invention for using the tracking error signal for calibration of a duty cycle of a MIRR signal.

FIG. 13 shows a disc drive 400 according to another embodiment of the present invention. Elements having the same reference number in FIGS. 5 and 13 refer to elements having similar structure and function. Thus, the disc drive 400 of FIG. 13 operates similarly to the disc drive 200 of FIG. 5 according to the flow-chart of FIG. 8. However, whereas the disc drive 200 of FIG. 5 uses the TE signal to calculate values of the gain parameters $G_1$ and $G_2$ of the gain amplifiers 238 and 240, the disc drive 400 of FIG. 13 uses the TE signal to calculate the value(s) of a DTYC (duty cycle) control signal for a MIRR (mirror) signal.

The MIRR signal is commonly used in CD-ROMs as a reference signal for determining a current track number over which the optical pick-up is positioned for reading coded information from the optical disc, as known to one of ordinary skill in the art of disc drives. Referring to FIG. 7, the main beam photo-detector 232 generates a RF main signal comprised of A, B, C, and D signals indicating a respective intensity of light in each of the four quadrants of the reflected main beam. Further referring to FIG. 7, the data signal synthesizer 236 uses such A, B, C, and D signals to generate a RFO (radio frequency output) data signal. Such a data signal synthesizer 236 is individually known to one of ordinary skill in the art of disc drives.

Figure 15:
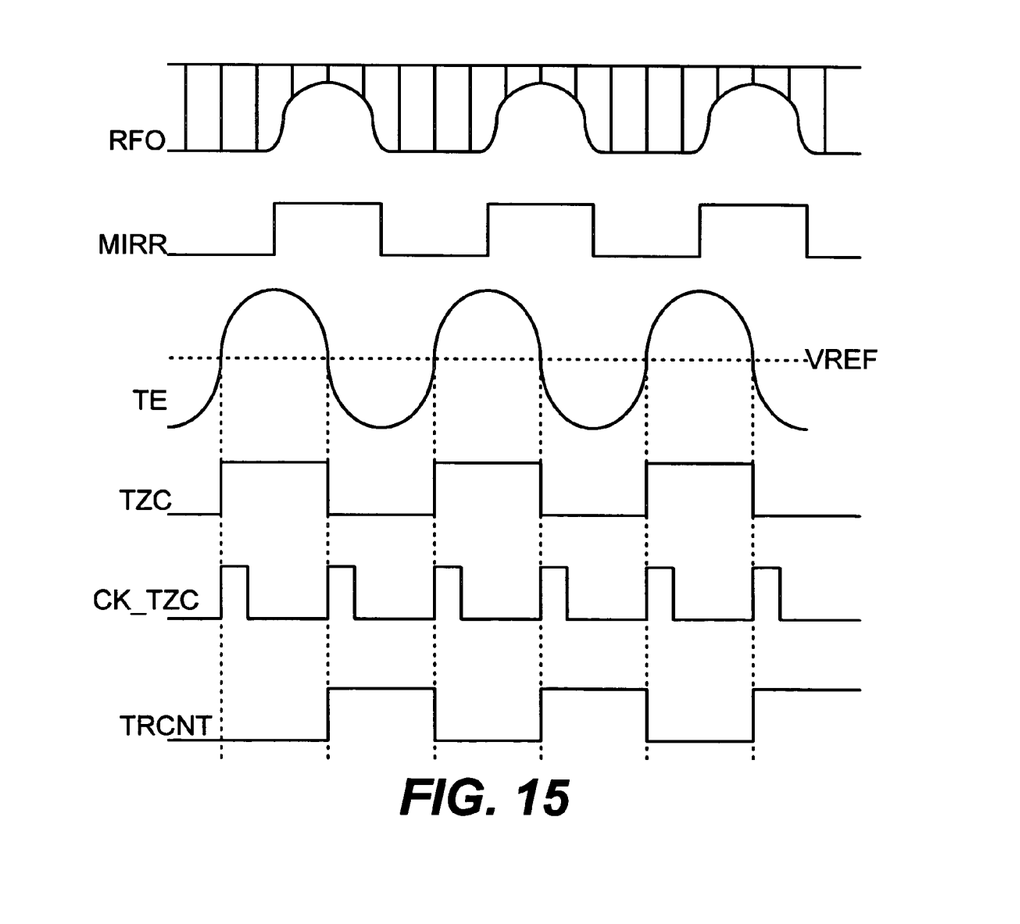
FIG. 15 shows timing diagrams of signals within the TRCNT generator and a mirror signal generator of FIGS. 13 and 14, according to an embodiment of the present invention.

Referring to FIGS. 13 and 15, the disc drive 400 of FIG. 13 includes a mirror signal generator 402 that inputs the RFO data signal to generate a MIRR (mirror) signal. The mirror signal generator 402 generates the MIRR signal from an envelope formed over the discrete values of the RFO data signal. Such a MIRR signal generator is individually known to one of ordinary skill in the art of disc drives.

Figure 14:
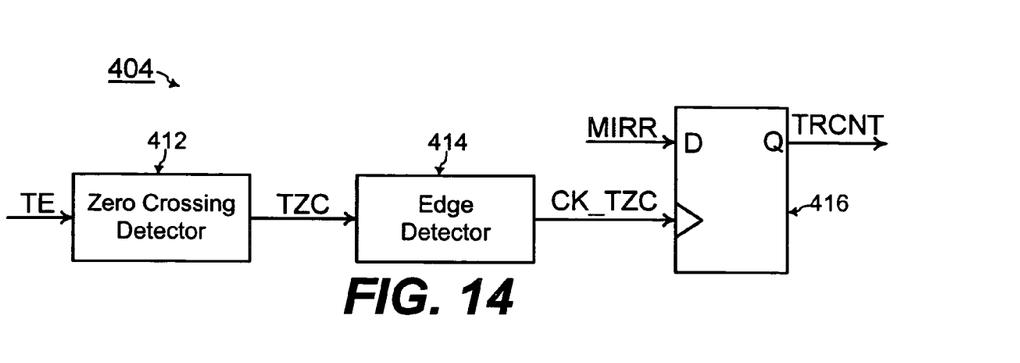
FIG. 14 shows a block diagram of components for a TRCNT generator of FIG. 13, according to an embodiment of the present invention.

In addition, the disc drive 400 of FIG. 13 includes a TRCNT generator 404 that inputs the MIRR signal from the mirror signal generator 402 and the TE signal from the RF unit 208 to generate a TRCNT (tracking count) signal. Referring to FIG. 14, the TRCNT generator 404 includes a zero crossing detector 412, an edge detector 414, and a delay flip-flop 416.

Referring to FIGS. 14 and 15, the zero crossing detector 412 receives the TE signal and generates a TZC (tracking zero crossing) signal with a transition occurring in the TZC signal every time the TE signal crosses the VREF level, as illustrated in FIG. 15. The edge detector 414 generates a pulse at every transition of the TZC signal to generate a CK_TZC (clock from track zero crossing) signal. The CK_TZC signal from the edge detector 414 is used as a clock signal to the delay flip-flop 416.

The MIRR signal from the mirror signal generator 402 is coupled to the D-input of the delay flip-flop 416 that generates the TRCNT signal as the MIRR signal synchronized to the CK_TZC signal, as illustrated in FIG. 15. Referring to FIG. 13, the MIRR signal and the TRCNT signal are input by a tracking balance controller 406 that uses such signals to determine the value(s) of the DTYC signal. Such a DTYC signal is used by the mirror signal generator 402 to generate the MIRR signal with a desired duty cycle, such as a 50% duty cycle for example.

In this manner, the disc drive 400 of FIG. 13 operates similarly to the disc drive 200 of FIG. 5 according to the flow-chart of FIG. 8. However, a difference between the two disc drives 200 and 400 occurs in step 260 of FIG. 8. The disc drive 200 of FIG. 5 uses the TE signal to calculate values of the gain parameters $G_1$ and $G_2$ of the gain amplifiers 238 and 240 in step 260 of FIG. 8. In contrast, the disc drive 400 of FIG. 13 uses the TE signal to calculate the value(s) of the DTYC control signal for the MIRR signal in step 260 of FIG. 8.

Figure 16:
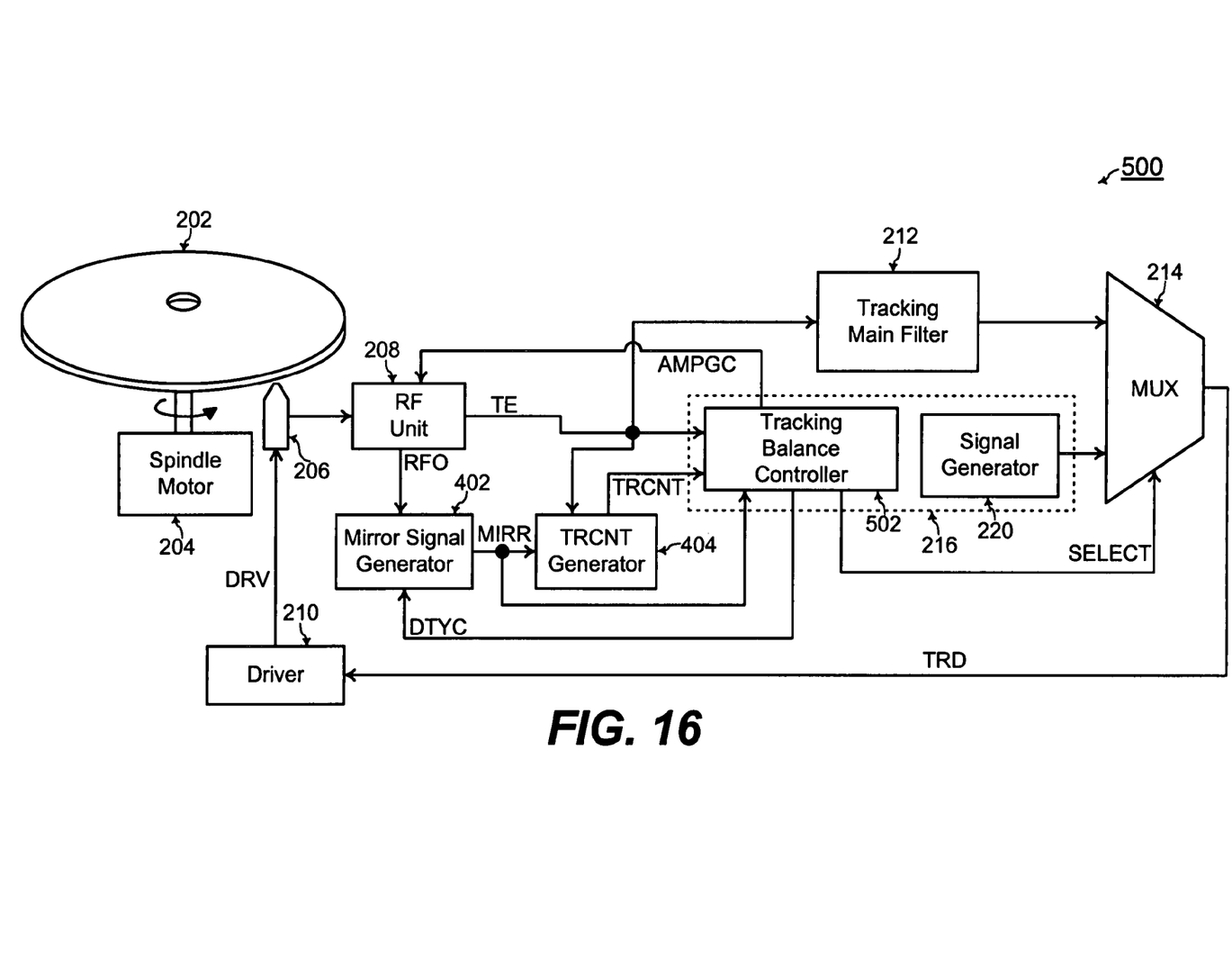
FIG. 16 shows a block diagram of an alternative embodiment of an optical disc drive of the present invention for using the tracking error signal for calibration of both the offset of the tracking error signal and the duty cycle of the MIRR signal.

Generally, the TE signal generated in step 258 of FIG. 8 may be used for calculating value(s) of any other types of calibration parameters in step 260 of FIG. 8 (aside from examples of the gains $G_1$ and $G_2$ in FIG. 5 and the value(s) of the DTYC control signal for the MIRR signal in FIG. 13). In addition, FIG. 16 shows a disc drive 500 according to another embodiment of the present invention. Elements having the same reference number in FIGS. 5, 13, and 16 refer to elements having similar structure and function. Thus, the disc drive 500 of FIG. 16 operates similarly to the disc drives 200 of FIGS. 5 and 400 of FIG. 13 according to the flow-chart of FIG. 8.

However, whereas the disc drive 200 of FIG. 5 uses the TE signal to calculate values of the gains $G_1$ and $G_2$ while the disc drive 400 of FIG. 13 uses the TE signal to calculate the value(s) of the DTYC control signal for the MIRR signal, the disc drive 500 of FIG. 16 includes components for determining both the values of the gains $G_1$ and $G_2$ and the value(s) of the DTYC control signal for the MIRR signal from the TE signal. Thus, the difference occurs just in step 260 of FIG. 8.

The disc drive 200 of FIG. 5 uses the TE signal to calculate values of the gain parameters $G_1$ and $G_2$ of the gain amplifiers 238 and 240 in step 260 of FIG. 8. The disc drive 400 of FIG. 13 uses the TE signal to calculate the value(s) of the DTYC control signal for the MIRR signal in step 260 of FIG. 8. The disc drive 500 of FIG. 16 has a tracking balance controller 502 with components for using the TE signal to calculate both the AMPGC control signal for the gains $G_1$ and $G_2$ and the DTYC control signal for the MIRR signal, in step 260 of FIG. 8.

The present invention is limited only as defined in the following claims and equivalents thereof.

The invention claimed is:

1. A method for determining a value of a calibration parameter in a disc drive, comprising:
    A. generating a track traversing signal for driving a pick-up to traverse across tracks of a disc in accordance with the track traversing signal that determines a path of the pick-up moving across the tracks;
    B. generating a tracking error signal with the pick-up traversing across the tracks of the disc according to the track traversing signal in step A; and
    C. determining the value of the calibration parameter from the tracking error signal.

2. The method of claim 1, further comprising:
    selecting the track traversing signal to be coupled to a driver for the pick-up in step A.

3. The method of claim 2, further comprising:
    selecting the tracking error signal to be coupled to the driver of the pick-up after step C.

4. The method of claim 1, further comprising:
    rotating the optical disc during step A.

5. The method of claim 1, wherein the pick-up is an optical pick-up, and wherein the calibration parameter includes a respective gain value determined from the tracking error signal for each of two amplifiers used for generating the tracking error signal.

6. The method of claim 1, further comprising:
    generating a data signal as the pick-up traverses across the tracks of the disc in accordance with the track traversing signal.

7. The method of claim 6, wherein the calibration parameter includes a duty cycle control value for a MIRR (mirror) signal, determined from the data signal and the tracking error signal, wherein the MIRR signal is used for determining a current track number over which the nick-up is positioned.

8. The method of claim 7, wherein the pick-up is an optical pick-up, and wherein the calibration parameter further includes a respective gain value determined from the tracking error signal for each of two amplifiers used for generating the tracking error signal.

9. The method of claim 1, wherein the track traversing signal is a periodic signal generated from a signal generator.

10. The method of claim 9, wherein the track traversing signal is a sine wave.

11. The method of claim 1, wherein values for the track traversing signal are stored within a memory device.

12. The method of claim 1, wherein the disc drive is an optical disc drive, and wherein the pick-up is an optical pick-up.

13. The method of claim 1, wherein steps A, B, and C are performed upon loading of the disc into the disc drive.

14. The method of claim 13, wherein steps A, B, and C are performed irrespective of a rotational speed of the disc.

15. The method of claim 13, wherein steps A, B, and C are performed before reproduction of data from the disc.

16. The method of claim 1, wherein the track traversing signal has a first frequency in a first range that is less than a second range of a second frequency of the tracking error signal.

17. A disc drive comprising:
    a signal generator that generates a track traversing signal;
    a driver that causes a pick-up to traverse across tracks of a disc in accordance with the track traversing signal that determines a path of the pick-up moving across the tracks;
    an error signal generator that generates a tracking error signal with the pick-up traversing across the tracks of the disc in accordance with the track traversing signal; and
    a parameter calculator that determines the value of the calibration parameter from the tracking error signal.

18. The disc drive of claim 17, further comprising:
    a signal selector that selects between the track traversing signal and the tracking error signal for being coupled to the driver of the pick-up.

19. The disc drive of claim 18, wherein the signal selector includes:
    a multiplexer that selects the track traversing signal to be coupled to the driver when the value of the calibration parameter is determined, and that selects the tracking error signal to be coupled to the driver after the value of the calibration parameter is determined.

20. The disc drive of claim 18, further comprising:
    a micom (micro-computer) for controlling the signal selector, the error signal generator, and the parameter calculator such that the value of the calibration parameter is determined upon loading of the disc into the disc drive.

21. The disk drive of claim 20, wherein the micom (micro-computer) controls the signal selector, the error signal generator, and the parameter calculator to determine the value of the calibration parameter irrespective of a rotational speed of the disc.

22. The disk drive of claim 20, wherein the micom (microcomputer) controls the signal selector, the error signal generator, and the parameter calculator to determine the value of the calibration parameter before reproduction of data from the disc.

23. The disc drive of claim 17, further comprising:
a spindle motor for rotating the disc as the pick-up traverses across the tracks of the disc in accordance with the track traversing signal.

24. The disc drive of claim 17, wherein the pick-up is an optical pick-up, and wherein the calibration calculator is a tracking balance controller for determining the calibration parameter that is a respective gain value determined from the tracking error signal for each of two amplifiers of the error signal generator.

25. The disc drive of claim 24, further comprising:
a data signal synthesizer that generates a data signal as the pick-up traverses across the tracks of the disc in accordance with the track traversing signal.

26. The disc drive of claim 25, wherein the parameter calculator determines a duty cycle control value for a MIRR (mirror) signal, from the data signal and the tracking error signal, wherein the MIRR signal is used for determining a current track number over which the pick-up is positioned.

27. The disc drive of claim 26, wherein the pick-up is an optical pick-up, and wherein the calibration calculator is a tracking balance controller for determining the calibration parameter that is a respective gain value determined from the tracking error signal for each of two amplifiers of the error signal generator.

28. The disc drive of claim 17, wherein the signal generator generates a periodic signal as the track traversing signal.

29. The disc drive of claim 28, wherein the signal generator generates a sine wave as the track traversing signal.

30. The disc drive of claim 17, wherein the signal generator includes a memory device for storing values for the track traversing signal.

31. The disc drive of claim 17, wherein the disc drive is an optical disc drive, and wherein the pick-up is an optical pick-up.

32. The disc drive of claim 17, wherein the track traversing signal has a first frequency in a first range that is less than a second range of a second frequency of the tracking error signal.

33. An optical disc tracking system comprising:
a signal generator for generating a track traversing signal; and
a tracking balance controller for processing a tracking error signal determined as a difference between a first signal and a second signal resulting from using the track traversing signal,
wherein the tracking error signal is generated with a pick-up traversing across tracks of a disc according to the track traversing signal within the optical disc tracking system.

34. The optical disc tracking system of claim 33, further comprising:
a micom (micro-computer) for selecting one of a first side beam and a second side beam of the light reflected from the disc to be used for generating the first and second signals.

35. The optical disc tracking system of claim 33, wherein the tracking balance controller determines a respective amplitude gain of at least one of the first and second signals from the tracking error signal.

36. The optical disc tracking system of claim 33, wherein the track traversing signal is a periodic signal.

37. The optical disc tracking system of claim 36, wherein the track traversing signal is one of a sine wave and a triangular wave.

38. The optical disc tracking system of claim 33, further comprising:
an optical pickup that is moved in accordance with the track traversing signal.

39. The optical disc tracking system of claim 33, wherein each of the first and second signals indicates a level of intensity of light for a respective portion of a side beam reflected from said disc.

40. The optical disc tracking system of claim 33, further comprising:
an analog to digital converter for converting the tracking error signal to a digital signal.

41. The optical disc tracking system of claim 33, wherein the signal generator generates the track traversing signal upon loading an optical disc.

42. The optical disc tracking system of claim 33, further comprising:
a mirror signal generator for generating a mirror signal from a data signal and a duty control signal that is generated from the tracking error signal.

43. The optical disc tracking system of claim 33, wherein the tracking balance controller generates the duty control signal from the tracking error signal for controlling a duty cycle of the mirror signal.

44. The optical disc tracking system of claim 33, further comprising:
a zero crossing detector for generating a crossing signal having a respective transition every time the tracking error signal crosses a reference level, wherein the crossing signal is used for generating the duty control signal.

45. The optical disc tracking system of claim 33, wherein the track traversing signal has a first frequency in a first range that is less than a second range of a second frequency of the tracking error signal.

* * * * *